United States Patent [19]

Powell et al.

[11] 3,909,288
[45] Sept. 30, 1975

[54] PROCESS FOR RECOVERY OF STARCH AND CORN OIL FROM CORN

[75] Inventors: Eugene L. Powell, Chicago, Ill.; Gerald G. McGeorge, Highland, Ind.

[73] Assignee: American Maize Products Company, New York, N.Y.

[22] Filed: Nov. 5, 1973

[21] Appl. No.: 412,734

[52] U.S. Cl. ............... 127/68; 127/67; 260/412.2; 260/412.4; 424/374
[51] Int. Cl.² .......................................... C13L 1/02
[58] Field of Search ............ 127/67, 68; 260/412.2, 260/412.8, 412.4

[56] References Cited
UNITED STATES PATENTS

| | | | |
|---|---|---|---|
| 2,459,548 | 1/1949 | Singer | 127/67 |
| 2,472,971 | 6/1949 | Hansen | 127/68 |
| 2,847,282 | 8/1958 | Dunning | 260/412.8 X |
| 3,029,169 | 4/1962 | Dowie | 127/67 |
| 3,251,717 | 5/1966 | Honeychurch | 127/68 |
| 3,597,274 | 8/1971 | Gillenwater | 127/68 |
| 3,734,901 | 5/1973 | Hayes | 260/412.4 X |

*Primary Examiner*—Morris O. Wolk
*Assistant Examiner*—Sidney Marantz
*Attorney, Agent, or Firm*—Eyre, Mann & Lucas

[57] ABSTRACT

A process for recovering starch and corn oil from corn kernels. The corn kernels are dry milled to separate the hulls and germ from the endosperm fractions. At least some of the endosperm fractions are steeped in separating the starch from the gluten. The gluten is dried and the separated germ and the dried corn gluten are subjected to solvent extraction to recover corn oil.

21 Claims, 1 Drawing Figure

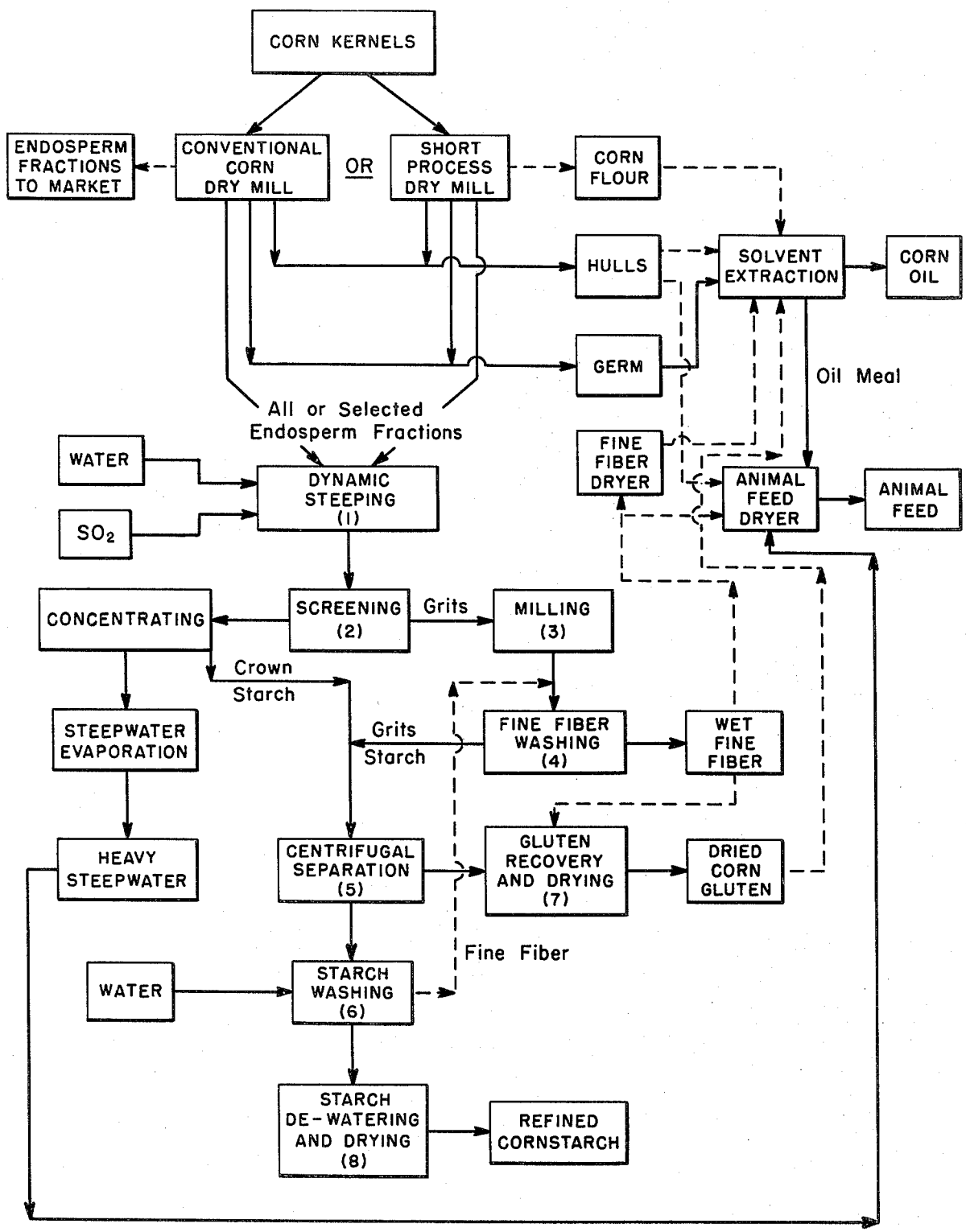

PROCESS FOR RECOVERY OF STARCH AND CORN OIL FROM CORN

The present invention relates to a new and useful wet milling process for the recovery of starch from corn kernels.

In present day processes, starch is recovered from corn kernels by steeping of the whole kernel in a dilute sufurous acid solution after which the hulls and germ are removed from the steeped kernel. A flow chart illustrating a typical commercial process can be found in *Starch, Chemistry and Technology*, Volume II at page 30. This book is published by Academic Press of New York (1967) and edited by Whistler and Paschall. As is known, the most valuable by-product in the recovery of starch from corn is corn oil. The corn oil is extracted primarily from germ after the germ is separated from the kernels. In order to accomplish separation of the germ it is, of course, necessary to have degerminating mills, germ separators, and germ dryers, all of which involve considerable expense.

In accordance with the present invention, the need for degermination mills, germ separators, germ dryers, and the screens and presses now required to wash and de-water the hulls and other expensive apparatuses are eliminated. This is accomplished by removing the hull and germ from the corn kernel before the steeping step. Removal of hull and germ from a corn kernel is, of course, well known in the art. It is the fundamental step in the so-called dry milling of corn. The remainder of the kernel after removal of hull and germ are called grits and these grits are commonly sold, especially for use in food products and the brewing of beer. After removal of the hull and germ in accordance with the present invention, the remaining grits are subjected to the wet milling process. However, because the hull and germ have already been removed, there is no need for degermination mills, germ separators or germ de-watering and drying equipment, etc. Additionally, because the hulls have been removed and the average particle size reduced, the steeping time is reduced from the usual 40-48 hours down to about ½-16 hours. Some of the advantages obtained in using the process according to the present invention are compared to the current wet milling process employed are as follows:

1. The two stages of degermination mills (the Foos mills) are entirely eliminated.
2. The germ separators or germ hydrocyclones (Dorrclones) and the machines normally required for washing, de-watering and drying germ are entirely eliminated.
3. The multi-stage coarse fiber washing screens and appurtenances are entirely eliminated.
4. The presses and dryers normally required for de-watering and drying the hydrated hulls are entirely eliminated.
5. The quantity of soluble solids introduced to the corn wet milling process is substantially reduced whereby the cost of separating, boiling down and drying the soluble solids is substantially reduced.
6. The steeping time is reduced from the usual 40-48 hours to ½-16 hours.
7. The overall capital investment for machines and buildings required for construction of a corn starch factory is substantially reduced since the number of machines is substantially reduced and the size of machines, especially the steeping tanks can be substantially reduced.
8. The operating costs of a corn starch factory are substantially reduced due to reduced requirements in manpower, utilities, maintenance, etc.
9. The overall yield of corn oil can be improved above the yields currently attained by either the dry milling process or the wet milling process.

It is quite surprising that all of these advantages can be obtained by simply removing the hull and germ before steeping the remaining grits. It is all the more surprising in light of all the advantages obtained that the process has not been tried before. It is known, for example, that removal of hulls before steeping substantially reduces the steeping time required (see for example, U.S. Pat. No. 2,527,585). There have been published reports of recovering starch from sorghum by first removing the hull and germ by dry milling followed by a shortened wet milling procedure applied only to the grits (see for example, "Experimental Wet Milling of Grain Sorghum Grits" which appeared in the *Transactions American Association of Cereal Chemists*, Volume 13, Number 3, October 1955, at pages 241–248). More recently processes have been disclosed for reducing the steeping time by cracking the kernels before steeping (see for example U.S. Pat. No. 3,597,274).

It is not known why the improved wet milling process of corn of the present invention has not been developed previously. It is thought that the reason might be that the majority of corn oil found in corn kernels is in the germ and it was thought necessary to use the standard wet milling process to recover a commercially feasible quantity of corn oil. It is pointed out in this regard that standard dry milling processes result in a corn oil recovery of only 45–50% as compared to the wet process recovery which usually amounts to 70–80%. Another possible reason is that the fines created by the grits would tend to clog the steeping tanks and their bottom screens. Of course, this problem is not present where the hulls are left on the kernel during the steeping step. Whatever the reason, the fact remains that until the present time no one has carried out the applicants' improved wet milling process even though the applicants' process is a highly desirable process with many beneficial advantages, especially from an economic point of view.

The drawing in the form of a flow chart illustrates applicants' process for recovering various components of corn.

The applicants' process will now be discussed in detail with reference to the enclosed flow chart.

The corn kernels are initially subjected to treatment to remove hulls and germ. This process can be carried out by any conventionally designed dry milling process provided that it removes substantially all of the germ and hull from the kernels.

Conventional corn dry mills produce a number of corn endosperm product streams, commonly referred to as "white goods" and characterized according to their average particle size and fat content. In order of decreasing particle size and increasing fat content, these streams are usually designated as flaking grits, No. 8 and No. 10 grits, brewer's grits, corn meal, cones and corn flour. If the conventional corn dry milling process is carried out any one or more of these endosperm fractions can be removed and sold as a by-product depending upon the economic situation prevailing at the time. The balance of the corn enndosperm fractions may then be subjected to the wet milling process. It is preferred to have the average fat content 1.5% or below in the stream fed into the wet milling module and the endosperm fractions which are removed preferably are not such as would upset this maximum fat content.

If maximum corn starch yield is the major objective the corn kernels can be subjected to "short process" dry milling. It is pointed out that short process dry milling gives the greatest economy. In this simplified process, the mill is arranged to provide only three product streams, i.e., hull, germ and total endosperm. Modification of the short process dry milling is available to provide a fourth product stream of corn flour since corn flour is frequently a profitable item and is therefore not necessarily subjected to the wet milling process. Additionally, drawing off the corn flour stream reduces the fat content of the endosperm fraction (which is desirable) without drastically reducing the overall starch yield.

The endosperm fractions from which starch is to be removed are first subjected to a steeping process (1). Steeping processes, as is well known, are carried out in dilute sulfurous acid. In order to prevent the relatively fine endosperm particles from clogging the steeping tanks and lines, it is preferred to keep the particles in suspension. We refer to this operation as "dynamic steeping." This can suitably be carried out either in a batch operation or as a continuous flow process. We prefer to use two tanks provided with agitators together with pumps with a re-cycle pipe. The agitators are used to keep the endosperm particles in suspension in the dilute sulfurous acid. One tank will normally be filling and steeping while the other is being processed. If a continuous operation is desired, two or more tanks suitably equipped with agitators can be arranged in series so that the endosperm particles in steepwater slurry move forward in a continuous flow.

The steepwater is made in conventional manner which may be by adding sulphur dioxide to process water recovered from the starch washing and gluten concentrating operations. Alternatively, liquid $SO_2$ may be injected into the endosperm slurry at the bottom of the steep tanks. An $SO_2$ concentration of between 0.25 and 0.01% is preferred. The higher $SO_2$ content applies to the steepwater concentration before the endosperm particles are added while the lower concentration ranges will be found at the end of the dynamic steeping step. The duration of the dynamic steeping step will be from about one-half to about 16 hours.

The time period is directly related to the particle size of the largest endosperm particles being used from the dry milling process. For example, the largest grits, i.e., flaking grits, may require as much as 16 hours of steeping time before an optimum separation of starch and gluten can be achieved yet corn flour will obtain an optimum separation after only one-half hour of steeping. One way to control steeping time is to select only those dry milled particles which pass a certain mesh screen or alternatively to keep milling the endosperm particles until they all pass a particular mesh. We have found that if all of the endosperm to be wet-milled is ground to pass through a 30-mesh screen, then the optimum steeping time is reduced to four hours or less. This compares very favorably with the steeping time of 40–48 hours required when whole kernel corn is steeped in conventional manner.

The steepwater slurry is suitably maintained at a pH of 3.5–4.5, preferably at a pH of 3.9–4.2.

The slurry concentration is limited only by the flow characteristics of the slurry as it is pumped from the steep tank. We have found slurry concentrations of between 15 and 27% corn dry solids to be suitable and, based on total slurry weight, this is a slurry density of between 9° and 15° Baume. We have found that best results are obtained with the higher end of the concentration range since it gives better attrition of the larger grit particles during the dynamic steeping operation and lowers the total volume of slurry to be pumped and processed.

After the endosperm particles are steeped, the remaining particles are separated from the steeped slurry (2). This is suitably accomplished in a screening step by means of reels, shakers or screenbends. We prefer to use DSM screens with 50 micron slots which are available from the Dorr-Oliver Company. This screeninng step separates the palpable corn particles from the starch-gluten slurry which is commonly referred to as the corn starch stream. The palpable corn particles are suspended in water and then subjected to a process for reducing their size, suitably a grinding or impact milling process. (3). The milled starch-gluten slurry commonly referred to as grit starch is subjected to a step wherein the fine fiber is separated from the grit starch (4). This is suitably also done by a screening step, suitably 50 micron DSM screens. The removal of the fine fiber is done so that the fibers will not plug centrifuge nozzles or lower quality of the refined corn starch obtained. The grit starch, after fine fiber separation, is then subjected to a starch-gluten separation process (5).

While the particles from the screening operation (2) are being milled and screened the crown starch slurry from the screening operation is being subjected to a separate process to separate teh crown starch from the steepwater (3a). This may be suitably accomplished by means of a nozzle bowl type centrifuge such as the Merco system available from Dorr-Oliver. The crown starch fraction is combined with the grit starch fraction just ahead of the starch-gluten separator (5).

The starch-gluten separation may be carried out in any desired manner. We prefer a two stage process the first of which is a centrifugal separation and the second of which is hydrocyclone arrangement. These systems are well known in the art. This multi-stage operation process will usually result in a corn gluten slurry with a protein content of 60% or higher and it will also result in a highly refined corn starch slurry low in protein, solubles and ash. The gluten and starch product streams after they are separated may be subjected to additional processing or de-watered and dried for market as desired. Conventional starch wash (6) will usually result in some fiber which can be recycled with the mainstream by combining it with the milled endosperm particles (3). By far the most valuable by-product obtained from any corn milling process is corn oil. One of the disadvantages of the corn dry milling process is that oil yield is usually only around 45–50% although it sometimes gets as high as 60% of the available corn oil. Corn wet milling processes, on the other hand, will usually recover 70–82% of the total corn oil present. The reason for the difference between the two processes is that the corn dry millers recover corn oil only from the dry mill germ stream. Their process leads to substantial losses of fine particles of broken germ to their hull and corn flour streams. Thus, their recovery of corn germs is only about 60% efficient. Wet millers recover oil from the entire germ since the germs remain essentially unbroken in the milling process. Thus, their overall recovery of germ is quite efficient with respect to that recovered by the dry millers.

We have found that in out process oil yields in excess of 85% of the corn oil present in the incoming grain can be realized. Thus, quite surprisingly, our process can recover more corn oil than can be recovered by even the best of the wet milling processes.

The process which we use to attain maximum corn oil yield is to combine the hulls and germ (and also corn flour if it has been separated) from the dry milling step with the dried corn gluten and the fine fiber from the wet milling step. This mixture is then flaked on flaking rolls in the usual manner and solvent extracted in known manner. Hexane or isopropyl alcohol are typically used as solvents but other suitable solvents can also be employed. Of course, the streams fed to solvent extraction will depend on a numner of factors. For example, there are situations where it is more desirable to sell a particular fraction without subjecting it to solvent extraction. Additionally, there may be times when the demand for corn oil is not that high, which would reduce the requirement for obtaining the maximum corn oil yield. It will therefore be understood that the number of product streams subjected to the solvent extraction is variable in accordance with the present invention. For acceptable commercial operation it is necessary to subject at least the germ stream and the dried corn gluten stream to the solvent extraction step. Preferably, any process stream carrying more than 1.5% oil in a dry solids basis is directed to the solvent extraction step after drying. The hull stream, the germ stream, the fine fiber stream and the dried corn gluten stream will usually all exceed the 1.5% oil content. While the hulls have virtually no oil in them, there will usually be fine particles of germ in the hull stream.

Where corn flour is separated during the dry milling process, an alternative solvent extraction is to subject the hulls, germ and corn flour streams to the solvent extracting step. In this case the overall corn oil yield is reduced to the 70–75% range, still considerably better than that which is obtained with conventional dry milling processes. The advantage of this alternative process is that the corm gluten from the wet milling module can be marketed as a 60% protein meal and will be rich in the desirable yellow pigment and Vitamin A content which it would not be if it were subjected to solvent extraction.

The corn hulls whether or not they are subjected to solvent extraction are suitably combined with the heavy steepwater which, after drying, provides an animal feed. Production of this animal feed is conventional in the wet milling process but it is pointed out that with the present process it is not necessary to dry the hulls as is true with conventional processes.

The germ meal and fine fiber whether or not the latter has been subjected to solvent extraction can also be combined with the heavy steepwater to form animal feeds.

All products which have been oil extracted are referred to as oil meal and all oil meal is suitably combined with heavy steepwater to form, after drying a new animal feeds.

These and other aspects of the present invention are illustrated by the following Examples.

As the first step of the process according to the present invention, corn kernels were subjected to conventional corn dry milling to separate the kernels into streams comprising hulls, germ and a number of white goods. The white goods product streams were virtually entirely free of hulls and substantially free of germ.

EXAMPLE 1

The largest particled white goods product stream comprised number 4 flaking grits. 200 Grams, dry basis, of these number 4 flaking grits were admixed with water having an $SO_2$ content of 0.05% to form a 1,150 gram slurry at 17.4% dry solids (about 10° Baume). The slurry was steeped for 16 hours at 125°F. During the steeping step, the particles were maintained in suspension by constant agitation. At the end of the steeping period, the pH of the slurry was 3.9 and the endosperm particles were quite soft. The entire steeped slurry was then screened utilizing a 325 mesh wire screen. 99 Grams of solids passed through the screen as a crown starch slurry; this crown starch slurry was free of palpable endosperm particles. The corn solids remaining on the screen were washed into a Waring blender by slurrying at 16% total solids in filtrate water recovered from the crown starch slurry. The blender was fitted with sharp cutting blades and wet milling was conducted for 15 minutes at high speed. The milled slurry was subjected to a screening through a 325 mesh wire screen to remove the fine fiber and other residues. 1.9 % of the total dry solids was removed as fine fiber.

The crown starch slurry, after concentration by filtration, was combined with the gluten-starch slurry from the fine fiber screening and the concentration of the combined slurry was adjusted to 8.5° Baume. The combined slurry was subjected to a first separating step (by centrifugation) which resulted in a good corn gluten product and a starch stream which averaged 0.71% protein on a dry solids basis. The starch stream was then washed and further refined by a second centrifuging step which resulted in a high quality refined starch that had an average protein content of only 0.37%.

EXAMPLE 2

The finest mesh endosperm fraction produced in the conventional corn dry milling process was corn flour. Essentially all of this corn flour passed through a 40 mesh screen and 56% of it was so fine that it passed 200 mesh. 200 Grams, dry basis, of this corn flour was admixed with water to make 1,250 grams of slurry at 16% dry solids (about 9° Baume). The slurry was kept under constant agitation to keep particles in suspension and was steeped for 1 hour at 125°F. Sulphur dioxide gas was bubbled into the steeping slurry periodically so as to maintain the pH at 3.9 throughout the run. At the end of the 1 hour steeping time, the slurry was immediately subjected to a screening as in Example 1. The palpable endosperm particles and crown starch were subjected to treatment as in Example 1. After the first separation by centrifugation, the starch stream had 0.34% protein and the final refined starch after the second centrifugation had 0.28% protein.

EXAMPLE 3

Example 2 was repeated except that the steeping time for the corn flour was reduced to one-half hour.

The steeping was carried out under continuous conditions with intensive agitation as opposed to the relatively minor agitation of Example 2 which was only sufficient to keep the particles in suspension. The starch stream after first centrifugation averaged 0.42% protein and the final refined starch averaged 0.34% protein.

EXAMPLE 4

In this example corn cones were selected as the white goods product to be employed for wet milling. The corn cones generally all passed through a 40 mesh screen but only 3% passed through a 100 mesh screen. 200 grams dry basis of the corn cones were combined with water to make an 800 gram slurry at 25% dry solids (14° Baume). The slurry, kept in suspension by agitation, was steeped for one hour at 125°F. with sulphur dioxide gas being injected periodically to maintain the slurry pH at 3.9. The highly concentrated steeped slurry was then diluted to 16% solids (9° Baume) at the first screening step. The palpable corn cone particles which did not pass through the 325 mesh screen were slurried in recovered steepwater and milled as in Example 1. When this milled product was filtered through a 325 mesh screen, total fine fiber was 8.4% of the total dry solids. The starch and gluten streams were subjected to further processing as in Example 1. After the first centrifuging step the starch had a protein content of 0.44% whereas the protein content was only 0.31% in the final refined starch.

EXAMPLE 5

By chemical analysis it was determined that the total corn endosperm output i.e., all of the white goods product streams combined and milled so as to pass a 30 mesh screen, was the approximate equivalent in average fat content and average particle size to a blend of 75% corn cones and 25% corn flour. 200 Grams, dry basis, of a 75% corn cone and 25% corn flour blend was suspended in sufficient water to form a 17.4% concentration (10° Baume). The suspension was steeped at 125°F. for 4 hours with periodic addition of sulphur dioxide to maintain a pH of 3.9. The steeped product was subjected to screening, milling and centrifuging as outlined in Example 1. The starch showed a protein content of 0.42% after the first separation step and 0.38% after the second separation step.

The starch, corn gluten and fine fiber were recovered by filtration and drying. All filtrates and wash waters were combined to determine total solubles. Analysis of the products gave the following yields as a percent of the dry solids input:

|  | % Yield |
| --- | --- |
| Starch at 0.38% Protein, dry basis | 81.9 |
| Corn Gluten at 68% Protein, dry basis | 7.6 |
| Steepwater solids (Solubles) | 5.6 |
| Fine Fiber | 4.9 |

EXAMPLE 6

33 Grams of dry mill corn germ was combined with 24 grams of dry mill corn hulls and 18 grams of dried corn gluten. The dried corn gluten was obtained from wet milling of all of the endosperm fractions of the corn kernel. This blend was ground in a cutting mill and yielded 75 grams of mix which had an oil content of 15.4%. The mixture was suspended in 200 grams of 99% isopropyl alcohol in a Cenco-Pinto type of Waring blender. The blender was fitted with a cover and an internal cooling coil to prevent overheating of the solvent. The mixture was subjected to high speed agitation for 10 minutes after which the slurry was filtered. The residual solids were washed with an additional 100 grams of isopropyl alcohol. Oil recovered from the solvent amounted to 11.5 grams which was better than 99.5% of the oil in the mixture. Approximately 0.1% of the oil was left in the extracted solids. Oil recovery when compared to the oil content of the whole corn grain fed to the conventional corn dry milling process was 90.3%. It is expected that an even higher oil yield would be obtained if the fine fibers were also subjected to the solvent extraction step.

While solvent extraction is the preferred method of recovering corn oil, it will be understood that other processes for the recovery of corn oil, such as expellers, can be employed if desired. However, solvent extraction is preferred since the use of oil expellers permits much greater losses of corn oil to the by-product animal feed.

It will be understood that the claims are intended to cover all changes and modifications of the preferred embodiments of the invention, herein chosen for the purpose of illustration, which do not constitute departures from the spirit and scope of the invention.

What is claimed is:

1. A process for recovering starch and corn oil from corn comprising:
    a. subjecting corn kernals to a dry separation process to separate hulls and germ from endosperm fractions;
    b. combining at least some of the endosperm fractions with water and subjecting the combination to a wet steeping step and further process steps to separate corn starch from corn gluten;
    c. drying the corn gluten; and
    d. subjecting at least the separated germ and the dried corn gluten tp a solvent extraction step to recover corn oil.

2. The process of claim 1 wherein step (a) is a corn dry milling process and the corn kernels are separated into a hull stream, a germ stream and a number of endosperm fraction streams.

3. The process of claim 1 wherein the oil meal resulting from the solvent extraction step is combined with heavy steepwater and hulls.

4. The process of claim 1 wherein fine fiber is recovered from the steeped endosperm fractions and the fine fiber is subjected to solvent extraction.

5. The process of claim 1 wherein the water-endosperm fraction admixture has a corn dry solids concentration of about 15-27%.

6. The process of claim 1 wherein the steeping is carried out for from about ½ hour to about 16 hours.

7. The process of claim 1 wherein the steeping temperature is from about 110°–130°F.

8. The process of claim 1 wherein step (a) is a short process dry milling procedure which separates the corn kernel into a hull stream, a germ stream and a corn flour stream and other endosperm fractions stream.

9. The process of claim 8 wherein the hull stream and the corn flour stream are also subjected to solvent extraction for the recovery of the corn oil.

10. The process of claim 1 wherein the endosperm fractions are maintained in suspension during the steeping step.

11. The process of claim 10 wherein the suspension is maintained by agitation.

12. The process of claim 1 wherein endosperm fractions are reduced in size so that they will pass through a 30 mesh/inch wire screen before they are combined with the water.

13. The process of claim 12 wherein the steep time is from about ½ to about 4 hours.

14. The process of claim 1 wherein the steeping is carried out in a sulfurous acid solution having a sulphur dioxide concentration of about 0.25 to about 0.01%.

15. The process of claim 14 wherein the pH of the steep is maintained at from about 3.5 to about 4.5.

16. The process of claim 15 wherein the pH is maintained at from about 3.9 to about 4.2.

17. The process of claim 1 wherein the crown starch suspended in water is separated from the palpable endosperm particles before the latter are subjected to wet milling.

18. The process of claim 17 wherein the crown starch slurry is separated from the steepwater with both starch and gluten being subsequently recovered from the crown starch fraction.

19. The process of claim 18 wherein the steepwater, after evaporation to form heavy steepwater, is combined with the hulls.

20. The process of claim 19 wherein the hull stream has been subjected to solvent extraction before combination with the steepwater.

21. A process for treating corn kernels comprising:
a. subjecting the corn kernels to a dry separation process to separate hulls and germ from endosperm fractions by forming a hull stream, a germ stream and at leasst one endosperm stream;
b. combining at least one of the endosperm streams with a sulfurous acid solution having a pH of from about 3.5 to about 4.5 and subjecting the combination to a wet dynamic steeping step for from about ½ hour to about 16 hours at temperatures ranging from about 110°–130°F;
c. separating the steeped endosperm into two streams comprising (1) crown starch suspended in water and (2) palpable endosperm particles;
d. milling the palpable endosperm particles and then recombining them with the crown starch slurry solids comprising starch and gluten which have been separated from the steepwater;
e. separating the combined palpable endosperm particles and crown starch slurry solids into streams comprising corn gluten and corn starch;
f. drying the corn gluten; and
g. subjecting at least the dried corn gluten and the germ stream to an extraction process to remove corn oil therefrom.

\* \* \* \* \*